United States Patent [19]
Feher

[11] 4,429,900
[45] Feb. 7, 1984

[54] AUTOMOTIVE SUSPENSION SYSTEM FOR MAINTAINING THE REAR WHEELS SUBSTANTIALLY PARALLEL TO ONE ANOTHER THROUGHOUT USE

[76] Inventor: Joseph S. Feher, 900 N. Hammond St., #115, Los Angeles, Calif. 90069

[21] Appl. No.: 204,541

[22] Filed: Nov. 6, 1980

[51] Int. Cl.³ .......................... B60G 3/14; B60G 19/02
[52] U.S. Cl. .................................... 280/689; 280/697; 180/73 TL
[58] Field of Search ............................ 280/689, 697; 180/73 TL; 73 TT

[56] References Cited

U.S. PATENT DOCUMENTS

| | | | |
|---|---|---|---|
| 1,155,528 | 10/1915 | Tennille | 280/697 X |
| 2,085,006 | 6/1937 | Coleman | 280/697 |
| 2,816,616 | 12/1957 | Hill | 280/697 X |
| 3,068,951 | 12/1962 | Brownback | 280/697 X |

FOREIGN PATENT DOCUMENTS 1518295  3/1968  France .......................... 180/73 TT Primary Examiner—Joseph Paul Brust
Attorney, Agent, or Firm—George J. Netter

[57] ABSTRACT

A suspension having each rear axle interconnected with a trunnion journaled in a crossbeam so that each wheel is rotatable about a horizontal axis extending at right angles to the wheel axle. A control link connects the trunnions such that rotation of one effects a corresponding rotation of the other and in the same direction. A double acting spring acts on the link resisting longitudinal movement of the link in either direction. The spring action is of predetermined character for providing the optimal relationship with respect to a self-centering force, camber rate and bump camber resistance.

7 Claims, 9 Drawing Figures

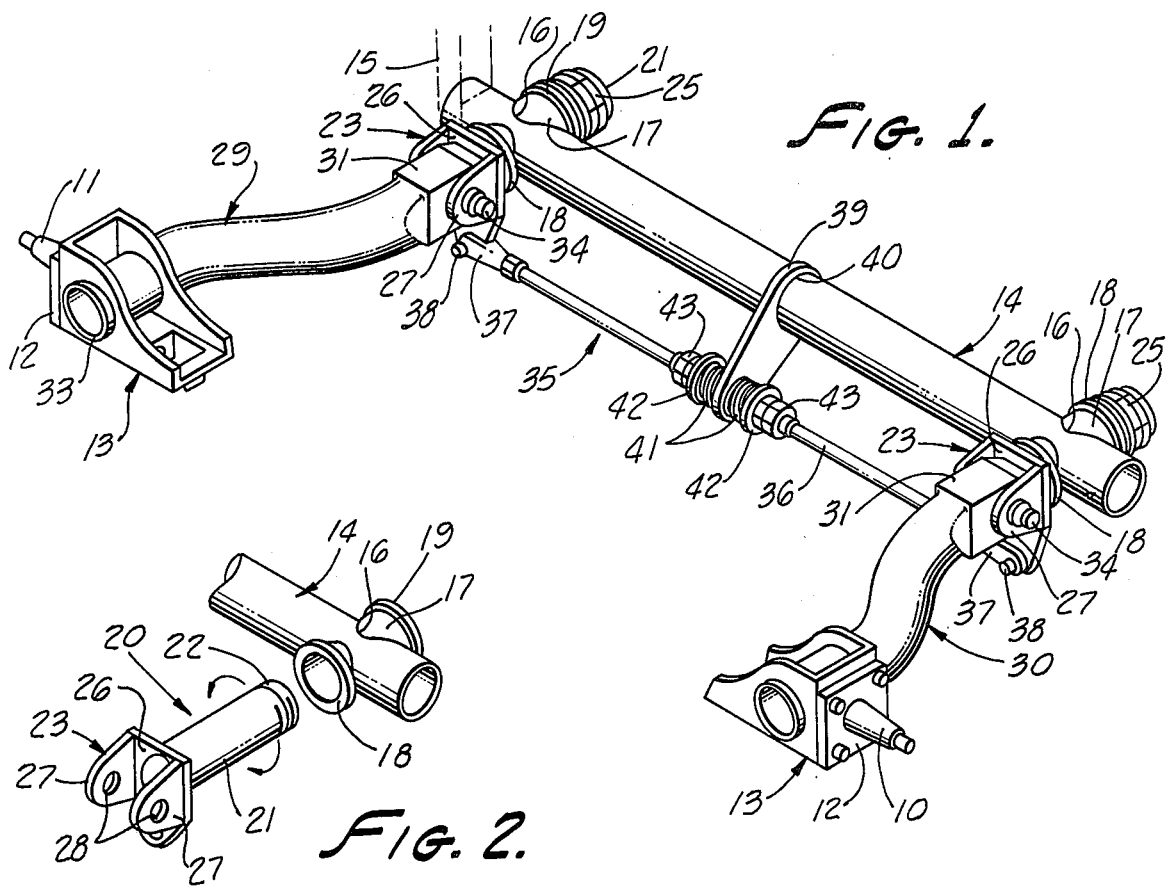
FIG. 1.
FIG. 2.
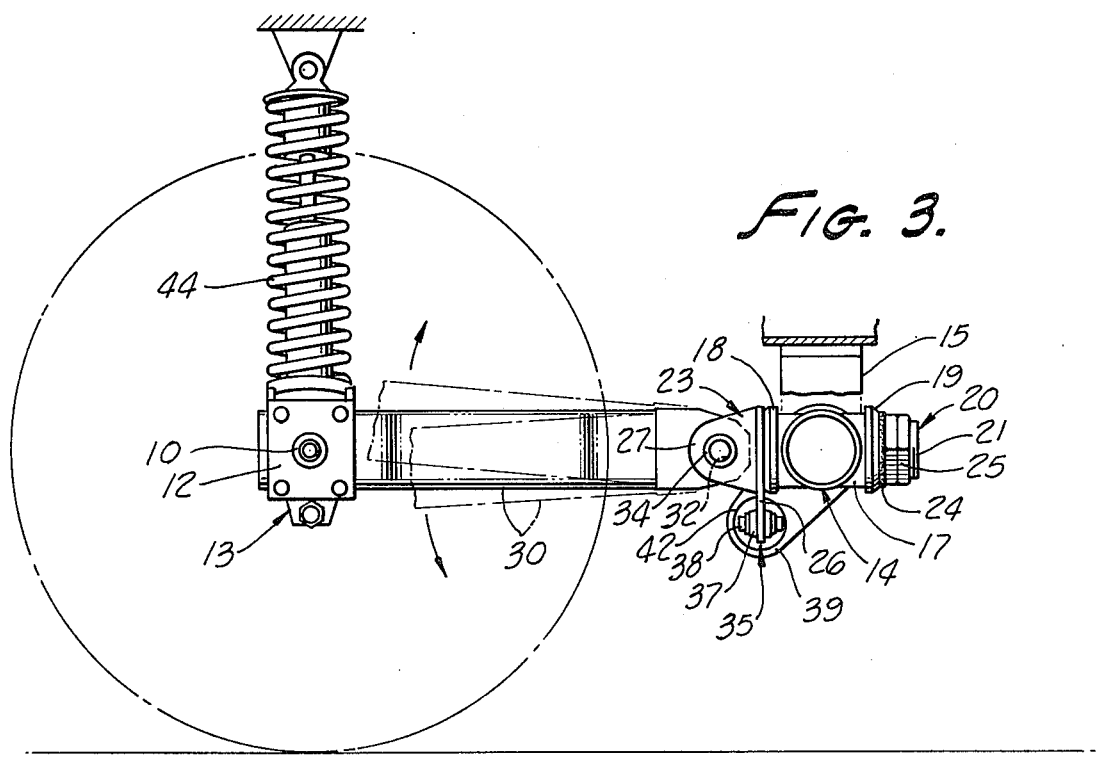
FIG. 3.

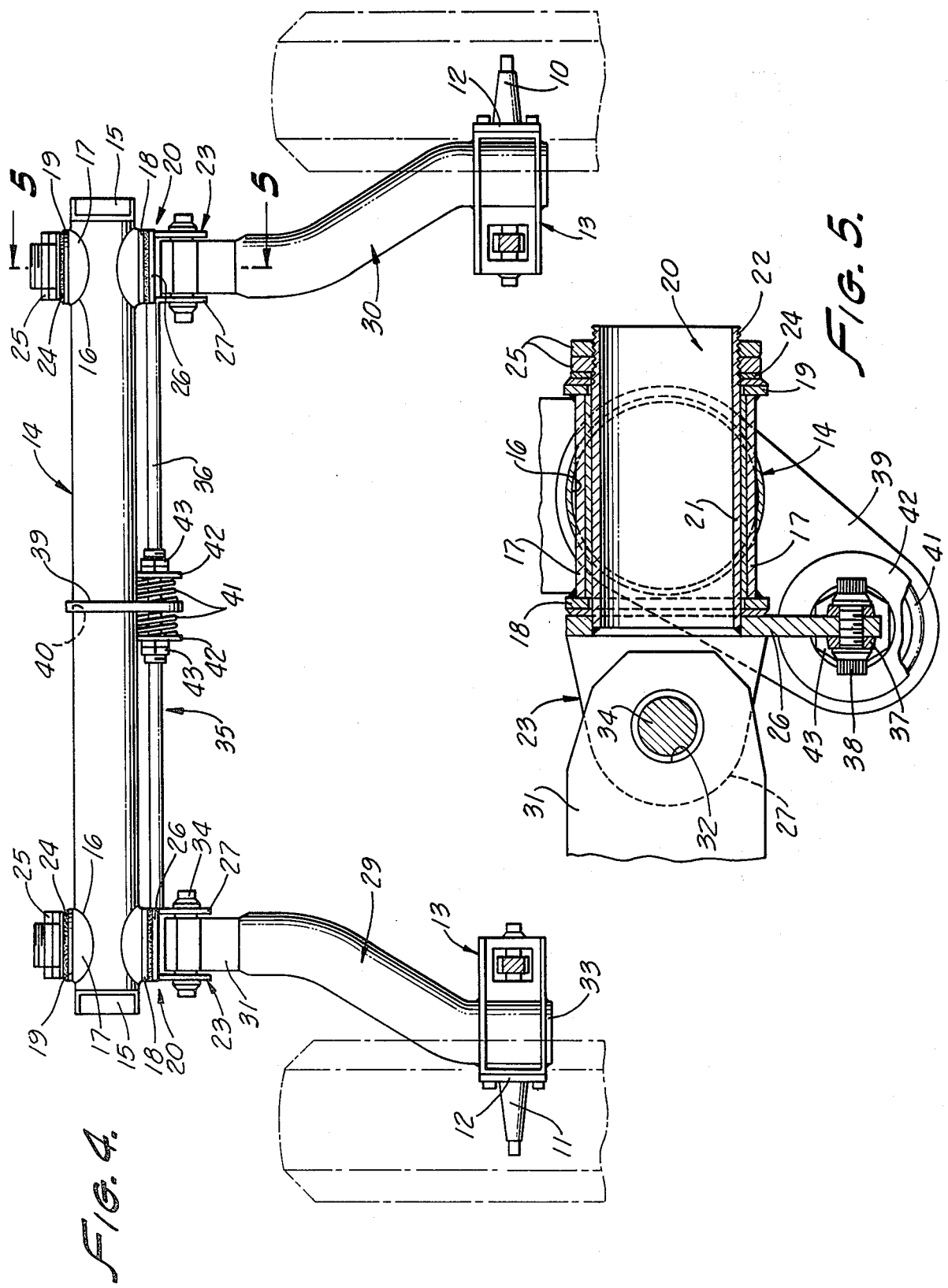

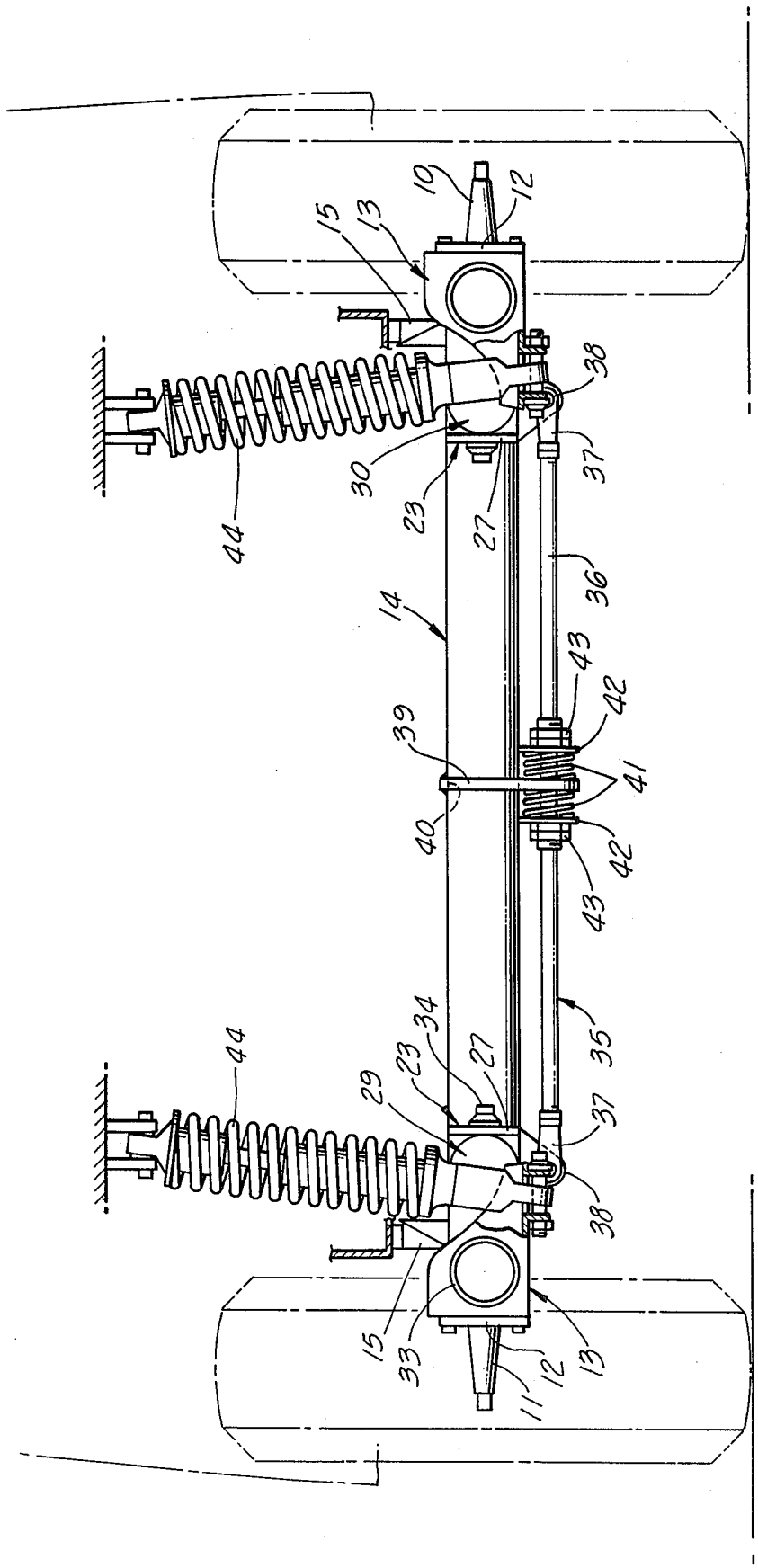
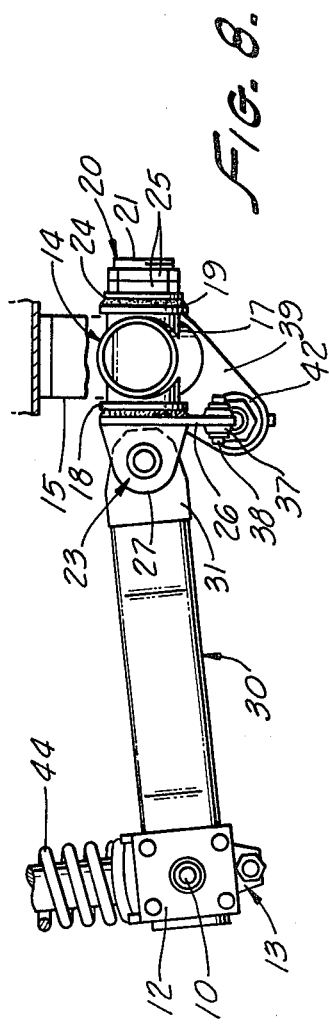

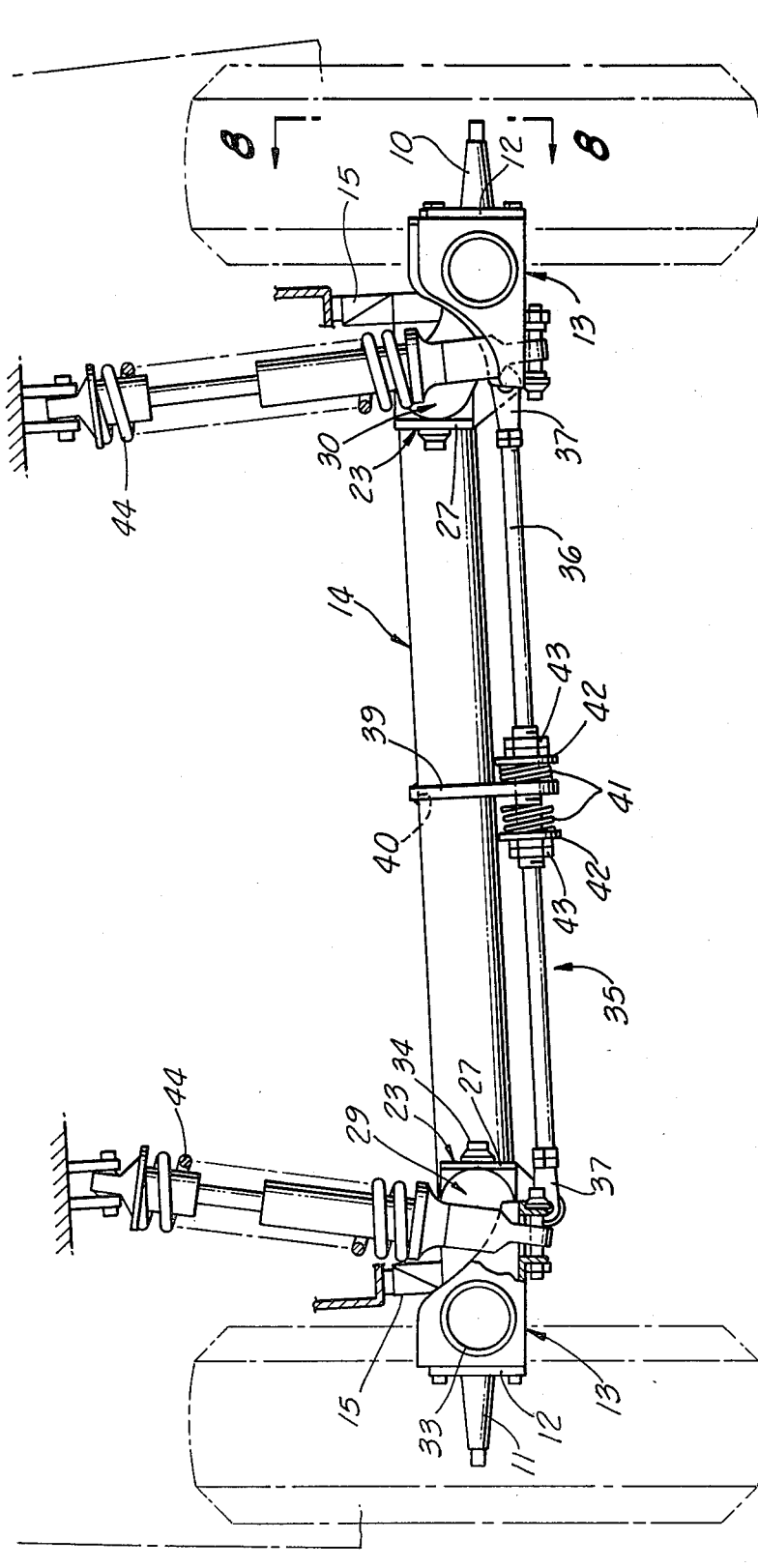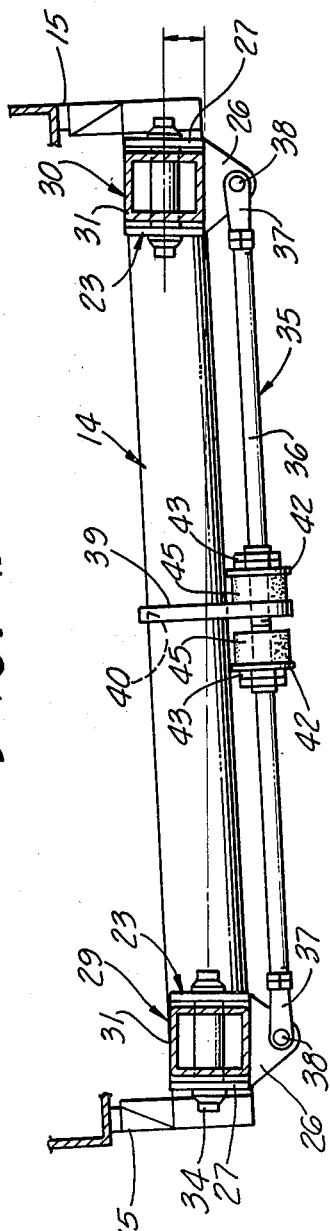
FIG. 7.
FIG. 9.

AUTOMOTIVE SUSPENSION SYSTEM FOR MAINTAINING THE REAR WHEELS SUBSTANTIALLY PARALLEL TO ONE ANOTHER THROUGHOUT USE

The present invention relates to an automotive suspension system and, more particularly, to such a system for maintaining the rear wheels of an automotive vehicle substantially parallel to one another throughout use.

BACKGROUND OF THE INVENTION

Suspension systems for the rear wheels of an automotive vehicle not only must provide sufficient resiliency for attenuating shocks and vibrations sufficiently for the comfort and safety of those using the vehicle, but also such suspension systems must provide for self-adjustive or coordinated positioning of the wheels when subjected to shocks, vibrations, and sliding with the aim of maximizing safety in driving and handling the vehicle. A satisfactory suspension system must be able to respond both safely and rapidly to a great variety of road conditions such as, for example, bumps or potholes acting on one or both wheels, a pothole on one wheel and a bump on the other, rolling, slipping and skidding both individually and when encountered simultaneously with bumps and potholes.

It can be shown that for maximal stability and riding comfort during a high-speed turn it is preferable that the wheels be maintained vertical to the ground plane throughout the turn. Also, it is particularly important for stability and comfort that the rear wheels be maintained mutually parallel and confined to vertical motion relative to the ground plane free of tow-in and tow-out steering effects in the event one of them encounters a bump or a pothole during a turn. All known suspension systems have not been completely satisfactory in maintaining this vertical relationship of the wheels relative to the ground plane throughout speed turns and when encountering road surface imperfections.

SUMMARY OF THE INVENTION

The suspension system of this invention has each wheel axis interconnected with a trunnion journaled in a crossbeam so that the axles of each wheel (and thus the wheels) are rotatable about a horizontal axis extending at right angles to the wheel axle. An elongated control link interconnects the trunnions together such that rotation of one of the trunnions effects a corresponding rotation of the other and in the same direction. A double acting spring assembly carried by a crossbeam acts on the link resisting longitudinal movement of the link in either direction. By virtue of the described system any rotation of one of the wheels accorded by the trunnion is transmitted to the other wheel whereby the two wheels are maintained in continuous parallelism. The spring action is of predetermined character for providing the optimal relationship with respect to a self-centering force, camber rate and bump camber resistance.

DESCRIPTION OF THE DRAWINGS

FIG. 1 is a perspective view of the suspension system of this invention.

FIG. 2 shows a trunnion and crossbeam in unassembled condition.

FIG. 3 is a side elevational, partially fragmentary view of a wheel and suspension system of this invention.

FIG. 4 is a plan view of the suspension system of FIG. 1 with the wheels shown in phantom depiction.

FIG. 5 is a side elevational, sectional view taken along the line 5—5 of FIG. 4.

FIG. 6 is an end elevational view of the suspension system of the invention shown on a flat surface.

FIG. 7 is an end elevational view similar to FIG. 6 showing the vehicle during a right turn.

FIG. 8 is a side elevational view taken along the line 8—8 of FIG. 7.

FIG. 9 depicts an alternative embodiment.

DESCRIPTION OF PREFERRED EMBODIMENTS

For convenience and clarity of description, FIG. 1 of the drawing shows the suspension system of the invention in its main elements with the various parts depicted removed from the automotive vehicle. The rear wheel axles 10 and 11 are of conventional construction and are shown affixed to a plate 12 which, in turn, is connected to a bracket 13 for conventional mounting via a coil spring and shock damper attenuating road induced shocks and vibrations. The suspension system does not interfere with the efficient operation of coil springs and shock damper customarily used in automotive vehicles today, but accomplishes its advantageous function in combination with these items.

Forwardly of the rear wheel axles 10 and 11, there is arranged a transversely extending crossbeam 14 affexed to the automotive vehicle frame in any suitable manner which for present purposes will be diagrammatically represented by the dash line support 15. In construction, the crossbeam 14 can be a steel tube or cylinder having sufficient rigidity and strength for present purposes and which is affixed to the undercarriage of the automotive vehicle body to extend at substantially 90 degrees to the longitudinal axis of the vehicle. Spaced inwardly from each end of the crossbeam are first and second openings 16 passing competely through the beam 14 and arranged mutually parallel to each other. Each of the openings 16 includes a tubular journal 17 tightly fitting therein one end of which includes an enlarged integral rim flange 18 and the other including a further flange 19.

With reference now simultaneously to FIGS. 1 and 2, within each of the tubular journals 17 there is received a trunnion 20 including a metal cylinder 21 with one end threaded as at 22 and having on its other end affixed to a clevis 23. More particularly, in assembly the cylindrical part 21 of the trunnion is rotatably within the bore of 17 and includes a thrust bearing 24 and a pair of nuts 25 which secure the trunnion within the journal while permitting it to rotate about the longitudinal axis of the part 21 as indicated by the arrows of FIG. 2.

The clevis 23 consists of a flat plate 26 which is welded or otherwise affixed at 90 degrees to the unthreaded end of the cylinder 21 and a pair of spaced apart members 27 extending at 90 degrees from the plate 26 in parallelism with each other. A pair of aligned openings 28 extend through the members 27 for a purpose to be described.

First and second trailing arms 29 and 30 are identical in construction and therefore for convenience only the arm 29 will be described here. Essentially, the trailing arm is an elongated hollow metal pipe or tube including a rectangular casting 31 welded to one end thereof with a transverse opening 32 passing therethrough (FIG. 3). In a practical construction of the invention, the trailing arms were formed into a slight S-shape with the opposite end formed parallel as at 33 to the casting 31 and laterally spaced therefrom (cf. plan view in FIG. 4). The casting 31 is of such dimensions and geometry as to permit receipt between the members 27 of the clevis 23 and mounted for rotation therein by a bolt 34. It is important to note that there are two degrees of motion freedom given to the trailing arm 29, namely, a swinging motion about the bolt 34 as an axis, and also a rotative motion within the journal 17 at 90 degrees to the swinging motion.

The end 33 of the trailing arm 29 is received through accommodating openings in the bracket 13 and affixed thereto by welding, for example, so that movements of the bracket and a wheel axle 10 or 11, as the case may be, are unitary with the trailing arm 29. With respect to the motions that are available to the axle 11 by the apparatus as described to this point, the axle can swing about the pin 34 as an axis and also can rotate within the journal 17 which latter movement is reflected in a corresponding angular adjustment of the wheel plane (i.e., camber) and concerning which more will be said later herein.

The trailing arm 30 is identical in construction and mounting to that of the just described trailing arm 29 except that the curved shape of each arm is the mirror image of the other.

With reference once again particularly to FIG. 1, the two clevises 23 are interconnected via a transverse camber control link 35 for the purpose of coordinating rotative movement of the two trailing arms. More particularly, by virtue of this control link any rotation of a trailing arm within the journal 17 of one of the arms will produce a predetermined corresponding amount of rotation of the other trailing arm.

The control link 35 includes a single elongated metal rod 36 the ends of which are threaded into first and second yokes 37 the bifurcated part of which is rotatably connected via pins 38 to an extension of the clevis plate 26. A divider plate 39 has an opening 40 via which it is received onto the crossbeam 14 and it is secured thereto by welding, for example. The control link rod 36 slidingly extends through a further opening in the divider plate. At each side of the divider plate there is located on the rod a compression coil spring 41 next to which is an oversize washer 42 and a pair of nuts 43 for lockingly positioning each of the springs against the divider plate 39. Assuming the vehicle is resting on a flat surface, the initial adjustments are made so that the springs 41 contact the divider plate 39 and are prestressed a predetermined amount. By virtue of this assemblage of springs, attempted movement of link rod 36 longitudinally in either direction is at first relatively unresisted to a specific point after which the movement is resisted by a self-centering force up to the limit of such movement.

In operation, for a straight run over a flat surfaced roadway the described invention does not effect any change in the relationship of the rear wheels, nor is any called for. Also, during a straight run if the roadway changes vertical height uniformly for both rear wheels, the only action on the wheels is that of one or both of the wheel springs 44 as shown by the arrows in FIG. 3. Moreover, as can be seen best in FIG. 6 both rear wheels are vertical to the ground plane and the camber control link springs 41 are at substantially the same degree of compression.

On the other hand, when the automotive vehicle is in the midst of a turn, there will be a tendency for the vehicle to move to the outside of the turn under the action of centripetal force as shown in the rear view of FIG. 7 depicting a right turn. At this time, the divider plate 39 will be forced against the right spring 41 compressing it further while relieving some or all of the compression in the left spring (as shown, all of the compression is removed). The control link 35 will produce a rotation of both wheels about the axes of the journals 17 which is identical, and which rotation will be reflected in a continuous parallelism of the rear wheels, the desired maximally safe arrangement.

Although as described herein the springs 41 are contemplated as exerting equal compressive force and the relatively geometry and dimensions of the parts for providing adjustable wheel camber are such as to produce equal camber variation of each rear wheel, this may not always be preferable. In certain situations it may be desirable either through the mechanical linkage or by different acting springs 41, to provide a different response for the left wheel than the right.

Moreover, although coil compression springs 41 have been used, it is contemplated that other spring members may be found satisfactory for this purpose, such as solid rubber spring means, and pneumatic or hydraulic devices.

Although there is no inherent limitation in the practice of this invention on the amount of camber angle change that can be effected, it is believed that a range of approximately 4 degrees in each direction is fully adequate for good stability and comfort where the vehicle is making a normal turn at a rate of speed not exceeding about 60 miles per hour (97 kilometers per hour).

The rear wheel suspension system described will tend to maintain the wheels parallel to one another and substantially perpendicular to the road surface throughout turning of the vehicle even when the road surface is relatively bumpy. This results in improved rear wheel steering effects and handling of the vehicle, generally. Since the wheel tire operating conditions are improved this should also enhance fuel economy.

I claim:

1. A rear wheel suspension system for an automotive vehicle, comprising:
   first and second trailing arm means each having one end affixed to a rear wheel axle;
   first and second clevis means movably connected with the respective other ends of the trailing arms enabling movement of the trailing arms thereabout in a substantially vertical plane;
   first and second cylindrical members affixed respectively to the first and second clevis means;
   an elongated beam having a pair of transverse openings therein spaced from each other along the beam, said openings rotatably receiving the respective cylindrical members therein;
   a control link having its ends pivotally interconnected with the clevis means for transmitting rotation of one clevis means and associated cylindrical member to the other clevis means and associated cylindrical member; and
   spring means carried by the control link for resiliently resisting movement thereof.

2. A rear wheel suspension system as in claim 1, in which each opening in said beam includes a hollow tubular journal extending through said beam opening and terminating at each end in an enlarged rim flange.

3. A rear wheel suspension system as in claim 2, in which each cylindrical member is rotatably received within a journal and includes a thrust bearing on each side of the beam contacting the respective journal flanges, and nut means on the outer end portion of said cylindrical member.

4. A rear wheel suspension as in claim 1, in which said control link includes an elongate rod having its ends pivotally connected to the first and second clevis means, a divider secured to the beam has an opening through which the control link rod freely passes, and a pair of spring means located one at each side of the divider plate resists longitudinal movement of said rod in either direction.

5. A rear wheel suspension system as in claim 4, in which each end of the control link rod is interconnected to a clevis means by a yoke.

6. A rear wheel suspension system as in claim 4, in which the spring means include first and second compression coil springs received on the control link rod, one on each side of the divider plate, and means threaded on the rod for engaging an outer end of each spring the other end of each spring being engageable with the divider plate.

7. A rear wheel suspension system as in claim 1, in which the maximum extent of rotation in either direction of each wheel via the cylindrical member and clevis is 4 degrees.

* * * * *